(12) United States Patent
Mehra et al.

(10) Patent No.: US 11,747,852 B2
(45) Date of Patent: Sep. 5, 2023

(54) METHOD AND APPARATUS FOR MAINTAINING STABLE OPERATION OF SERVERS IN A DATA CENTER

(71) Applicant: Advanced Micro Devices, Inc., Santa Clara, CA (US)

(72) Inventors: Amitabh Mehra, Fort Collins, CO (US); Jeffrey N. Burley, Fort Collins, CO (US); Anil Harwani, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 150 days.

(21) Appl. No.: 16/726,167

(22) Filed: Dec. 23, 2019

(65) Prior Publication Data

US 2021/0191450 A1    Jun. 24, 2021

(51) Int. Cl.
G06F 1/08 (2006.01)
G06F 11/30 (2006.01)
G06F 1/26 (2006.01)

(52) U.S. Cl.
CPC ............... *G06F 1/08* (2013.01); *G06F 1/26* (2013.01); *G06F 11/3055* (2013.01); *G06F 11/3058* (2013.01)

(58) Field of Classification Search
None
See application file for complete search history.

(56) References Cited

U.S. PATENT DOCUMENTS

| | | |
|---|---|---|
| 7,382,366 B1 | 6/2008 | Klock et al. |
| 2006/0047989 A1 | 3/2006 | Delgado et al. |
| 2008/0082881 A1 * | 4/2008 | Szydlowski ............ G06F 11/24 714/731 |
| 2010/0125436 A1 * | 5/2010 | Chase ..................... G06F 11/24 702/186 |
| 2011/0080202 A1 * | 4/2011 | Moore ................... G06F 1/3234 327/276 |
| 2013/0254569 A1 * | 9/2013 | Kozaczuk ............. G06F 1/3287 713/320 |
| 2014/0191734 A1 * | 7/2014 | Kuang .................. G06F 1/3206 323/234 |
| 2017/0068309 A1 * | 3/2017 | Toosizadeh ........... G06F 1/3206 |
| 2018/0293291 A1 * | 10/2018 | Pawar ..................... G06F 16/27 |
| 2019/0278741 A1 * | 9/2019 | Hovis ................ G11C 29/4401 |
| 2019/0324517 A1 * | 10/2019 | Keceli ..................... G06F 1/206 |
| 2019/0369656 A1 | 12/2019 | Han |
| 2019/0384603 A1 * | 12/2019 | Kim ...................... G06F 9/3836 |
| 2021/0004073 A1 * | 1/2021 | Shah ..................... G06F 1/3212 |

FOREIGN PATENT DOCUMENTS

| | | |
|---|---|---|
| JP | 2019-003279 A2 | 1/2019 |
| WO | 2015-037158 A1 | 3/2015 |

OTHER PUBLICATIONS

Subset, 2022, Wikipedia (Year: 2022).*

* cited by examiner

*Primary Examiner* — Danny Chan
(74) *Attorney, Agent, or Firm* — Volpe Koenig

(57) ABSTRACT

A method and apparatus for managing overclocking in a data center includes determining a frequency limit of a first processor of a first server in the data center. The voltage of the first processor is lowered to a stability point, and the frequency is lowered. The first server is tested for stability. Based upon the results of the test, the voltage and frequency modifications are deployed to a second processor of a second server in the data center.

20 Claims, 3 Drawing Sheets

METHOD AND APPARATUS FOR MAINTAINING STABLE OPERATION OF SERVERS IN A DATA CENTER

BACKGROUND

As the need for computing and information processing progressively increases, the application of data centers has become widespread. A data center includes a potentially large number of networked computers that can be used to process and store large amounts of data. In many cases, the processors in these computers may be stored in racks and overclocked to increase performance. However, overclocking a processor causes an increase in heat generation, which potentially degrades operation.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for determining an optimal operating point for overclocked systems in a datacenter environment is described. There are several considerations when overclocking a datacenter, including power delivery, performance per watt, stability, and cooling/thermals. The frequency limit of the processor based on the maximum stable temperature is determined. The voltage is then lowered to the point of stability, and then the frequency is lowered to provide guardband. Once this operating point is determined, a stability tool is run to stress the system beyond normal server workloads. After proving stability, automated deployment is effected across the datacenter. The stability test is then run on the entire overclocked datacenter. The deployment can be the same across a datacenter, or customized per server. Once the datacenter wide deployment passes the stability stability test, normal jobs can proceed.

A method for managing overclocking in a data center includes determining a frequency limit of a first processor of a first server in the data center. The voltage of the first processor is lowered to a stability point, and the frequency is lowered. The first server is tested for stability. Based upon the results of the test, the voltage and frequency modifications are deployed to a second processor of a second server in the data center.

An apparatus for managing overclocking in a data center includes a first server including a first processor, and a second server including a second processor. The first processor of the first server determines a frequency limit for the first processor of the first server in the data center, lowers a voltage of the first processor to a stability point, lowers the frequency of the first processor, tests the first server for stability, and based upon the results of the test, deploys the voltage and frequency modifications to the second processor of the second server in the data center.

A non-transitory computer-readable medium for managing overclocking in a data center has instructions recorded thereon, that when executed by the processor, cause the processor to perform operations. The operations include determining a frequency limit of a first processor of a first server in the data center, lowering a voltage of the first processor to a stability point, lowering the frequency of the first processor, testing the first server for stability, and based upon the results of the test, deploying the voltage and frequency modifications to a second processor of a second server in the data center.

Figure 1:
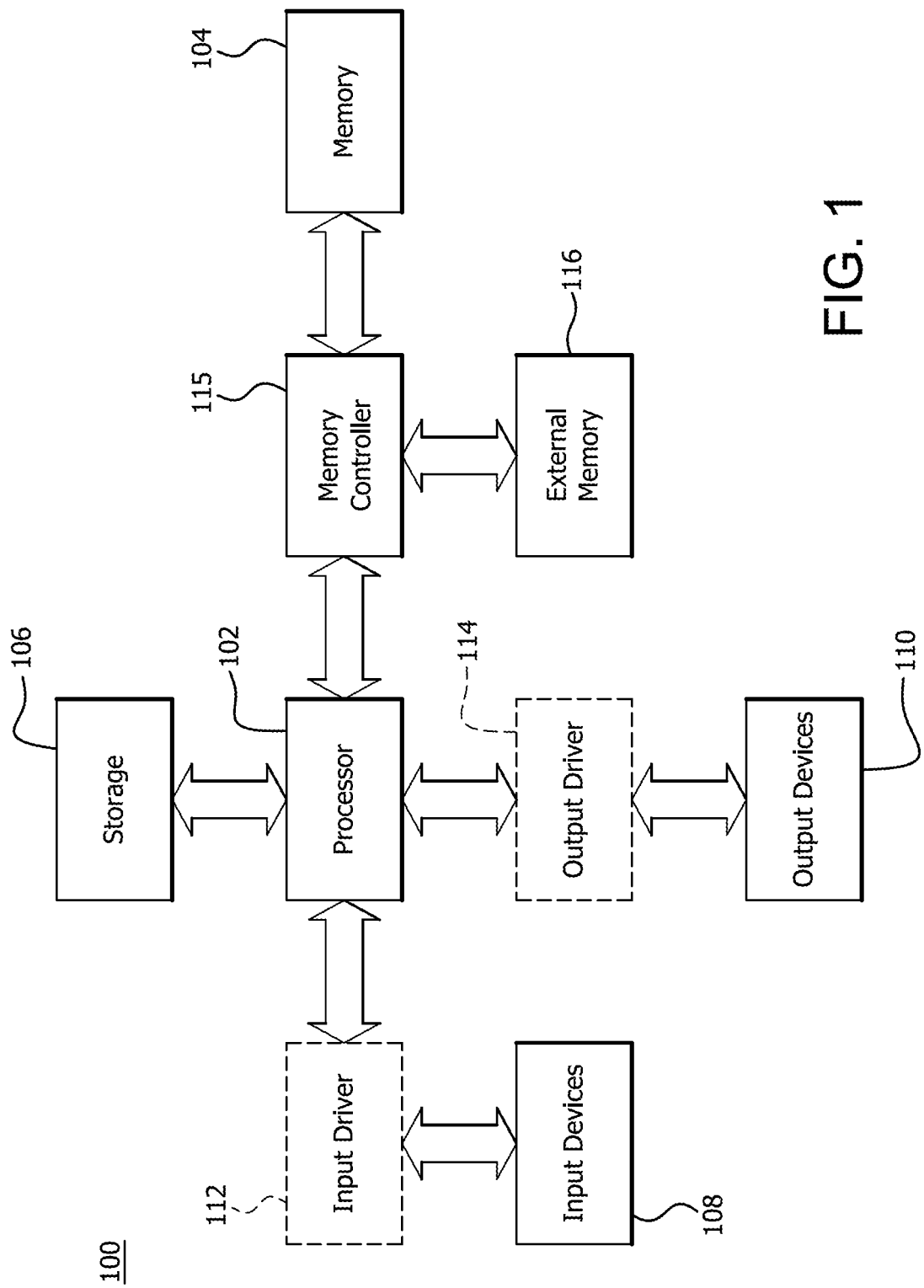
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
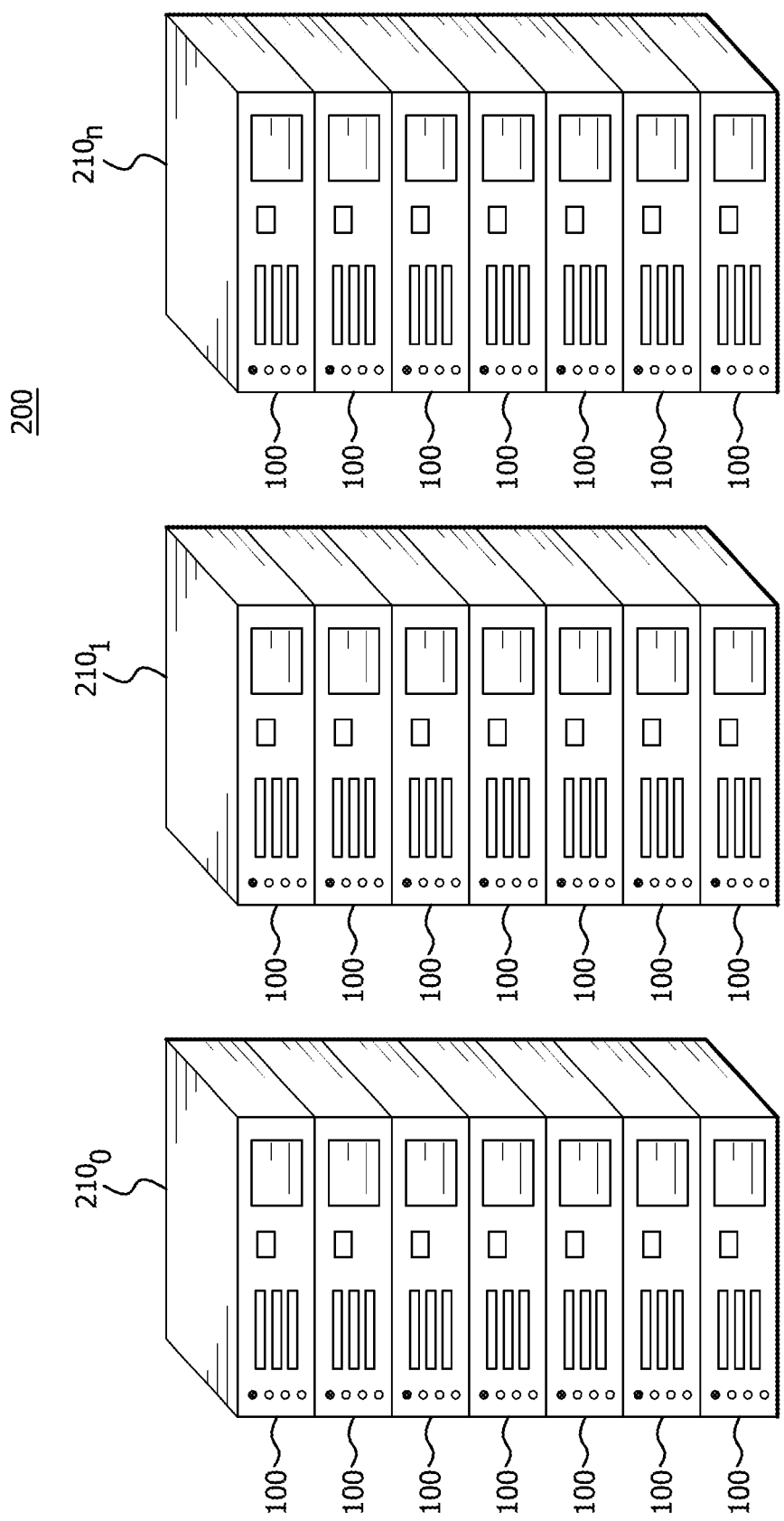
FIG. 2 is a schematic diagram of an example data center.

FIG. 2 is a schematic diagram of an example data center 200. The data center 200 includes a plurality of racks 210 (designated $210_1, 210_2, \ldots, 210_n$). Each of the racks 210 includes a plurality of computer servers (e.g., device 100). The computer servers collectively perform processing for the data center 200.

Figure 3:
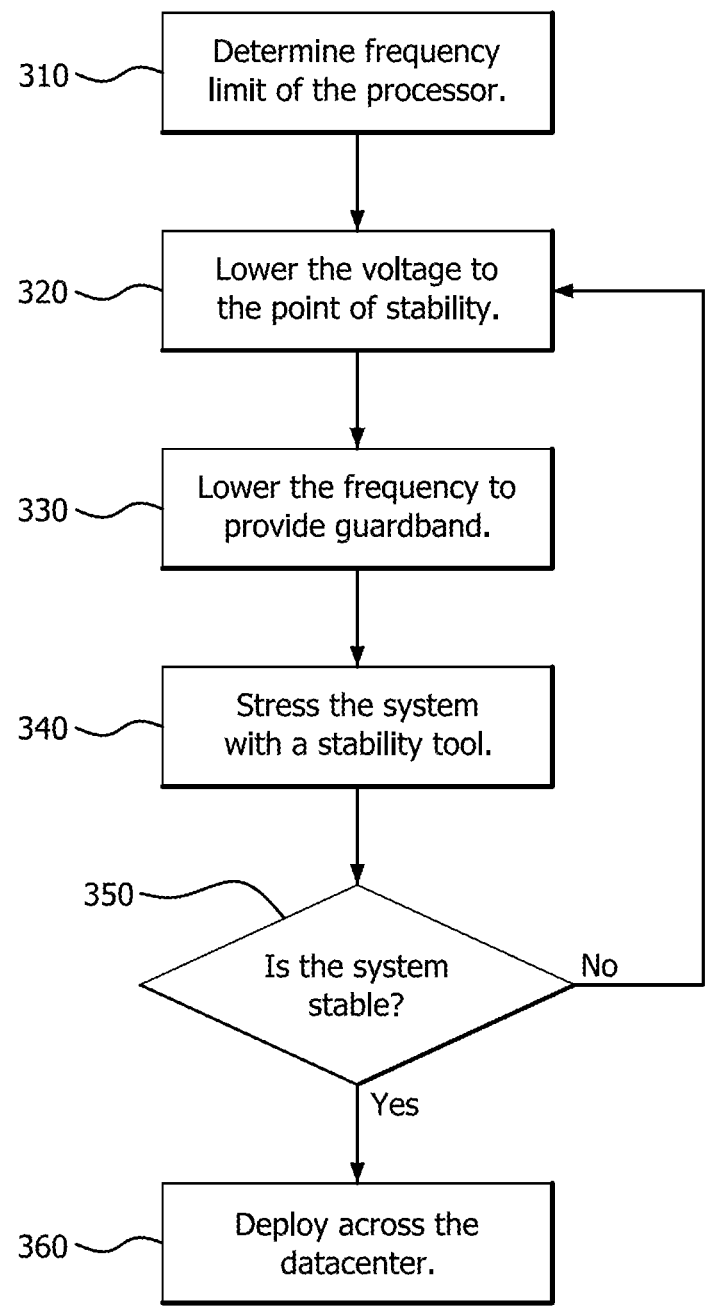
FIG. 3 is a flow diagram of an example method of managing overclocking in the example data center of FIG. 2.

FIG. 3 is a flow diagram of an example method 300 of managing overclocking in the example data center of FIG. 2.

In step 310, the frequency limit of the processor is determined. The determination is performed based on the maximum stable temperature at which the processor can operate. Once the frequency limit is determined, the voltage of the processor is lowered to the point of stability (step 320), and the frequency is lowered to provide guardband (step 330). Accordingly, lowering the voltage guards against overcurrents or overtemperatures in the processors. Additionally, once the point of stability is determined, the voltage can be further reduced (e.g., by 2%) to further protect against overcurrents when all of the systems 100 in a rack 210 are overclocked.

In step 340, the system is stressed with a stability tool beyond normal workloads in order to test the system operation. If the system passes the test and is stable (step 350), then the frequency and voltage settings are deployed across the entire data center 200 (step 360), otherwise the method reverts to step 320. The stability test can then run on the entire overclocked datacenter. The deployment can be the same across a datacenter, or customized per server. That is, some servers may have frequency and voltage modifications while others do not have modifications. Once the datacenter wide deployment passes the stability test, normal jobs can proceed.

The changes that may be implemented may be component and part specific. That is, certain parts and components from a particular bin of produced parts and components may operate cooler at the same voltage as the same part or component from a different bin. Accordingly, the voltage and frequency changes may be implemented to achieve stability on that specific bin of parts and not on parts or components from another bin.

Different approaches for optimizing the data center 200 can be taken for different workload types. For example, on lightly threaded jobs, cores of a processor can be disabled as well as disabling multi-threading to provide higher frequency operation in the server. On heavily threaded jobs, a higher effective frequency can be maintained to increase throughput. This technique can be applied to reduce total the total number of systems 100 required in the data center 200, and also to reduce the runtime for long jobs. Both of these can positively impact the total cost of ownership (TCO) of the data center 200.

It is also necessary to manage the time stamp counter (TSC) so that the servers remain in synchronization even when overclocked. Core power management features including turbo, boost and c-states can be disabled if necessary. Frequency can be remotely monitored to detect thermal throttling or other system anomalies to proactively remove a server from service. System chassis design for each rack 210 allows for considerably increased cooling. This includes room for additional and more powerful fans, increased thickness of heatsinks, and improved airflow. This will allow for lower operating temperatures and higher operating frequencies.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for managing overclocking in a data center, comprising:
   determining a frequency limit of a first processor of a first server in the data center;
   modifying a voltage of the first processor to a lowered voltage by lowering the voltage to a stability point;
   modifying a frequency of the first processor to a lowered frequency limit by lowering the frequency limit based upon the lowered voltage;
   testing the first server for stability;
   based upon the testing, deploying modifications to a second processor of a second server in the data center using the lowered voltage and the lowered frequency limit; and
   maintaining a higher effective frequency on a third processor of a third server in the data center in comparison to the first processor based on a workload of the data center.

2. The method of claim 1, wherein the voltage of the first processor is lowered to a guardband level.

3. The method of claim 2, wherein the voltage of the first processor is lowered to level that prevents an overcurrent in the first processor.

4. The method of claim 2, wherein the voltage of the first processor is lowered to a level that prevents an overfrequency in the first processor.

5. The method of claim 2, further comprising lowering the voltage of the first processor below the guardband level after determining the stability point.

6. The method of claim 1, wherein the voltage and frequency modifications are deployed to plurality of servers in the data center.

7. The method of claim 1, wherein a first core of the first processor is disabled.

8. The method of claim 1, wherein the workload is determined based on a number of heavily threaded jobs that are executed.

9. The method of claim 1, wherein the frequency limit is determined based on a maximum stable temperature at which the first processor can operate.

10. The method of claim 1, wherein the first processor and the second processor are from a same bin of produced parts.

11. An apparatus for managing overclocking in a data center, the apparatus comprising:
- a communication interface that is communicatively coupled to a first server including a first processor, a second server including a second processor, and a third server including a third processor; and
- a processor that is communicatively coupled to the communication interface, wherein the processor:
  - determines a frequency limit for the first processor of the first server in the data center,
  - modifies a voltage of the first processor to a lowered voltage by lowering the voltage to a stability point,
  - modifies a frequency of the first processor to a lowered frequency limit by lowering the frequency limit based upon the lowered voltage,
  - tests the first server for stability to generate results,
  - based upon the results, deploys modifications to a second of processor of the second server in the data center using the lowered voltage and the lowered frequency limit, and
  - maintains a higher effective frequency on the third processor in comparison to the first processor based on a workload of the data center.

12. The apparatus of claim 11, wherein the voltage of the first processor is lowered to a guardband level.

13. The apparatus of claim 12, wherein the voltage of the first processor is lowered to level that prevents an overcurrent in the first processor.

14. The apparatus of claim 12, wherein the voltage of the first processor is lowered to a level that prevents an over frequency in the first processor.

15. The apparatus of claim 12, wherein the voltage of the first processor is lowered below the guardband level after determining the stability point.

16. The apparatus of claim 11, wherein the voltage and frequency modifications are deployed to plurality of servers in the data center.

17. The apparatus of claim 11, wherein a first core of the first processor is disabled.

18. The apparatus of claim 11, wherein the workload is determined based on a number of heavily threaded jobs that are executed.

19. The apparatus of claim 11, wherein the first processor and the second processor are from a same bin of produced parts.

20. A non-transitory computer-readable medium for managing overclocking in a data center, the non-transitory computer-readable medium having instructions recorded thereon, that when executed by a processor, cause the processor to execute a method comprising:
- determining a frequency limit of a first processor of a first server in the data center;
- modifying a voltage of the first processor to a lowered voltage by lowering the voltage to a stability point;
- modifying a frequency of the first processor to a lowered frequency limit by lowering the frequency limit based upon the lowered voltage;
- testing the first server for stability;
- based upon the testing, deploying the—modifications to a second processor of a second server in the data center using the lowered voltage and the lowered frequency limit; and
- maintaining a higher effective frequency on a third processor of a third server in the data center in comparison to the first processor based on a workload of the data center.

* * * * *